US012676081B1

(12) United States Patent
Collins

(10) Patent No.: US 12,676,081 B1
(45) Date of Patent: Jul. 7, 2026

(54) INTERACTIVE WARNING PAD FOR ENHANCED USER FEEDBACK

(71) Applicant: Brighterway Solutions, Inc., Santa Ana, CA (US)

(72) Inventor: Jeffrey Jay Collins, Santa Ana, CA (US)

(73) Assignee: Brighterway Solutions, Inc., Sant Ana, CA (US)

( * ) Notice: Subject to any disclaimer, the term of this patent is extended or adjusted under 35 U.S.C. 154(b) by 0 days.

(21) Appl. No.: 19/296,365

(22) Filed: Aug. 11, 2025

(51) Int. Cl.
| | |
|---|---|
| *H04W 4/80* | (2018.01) |
| *G08B 7/06* | (2006.01) |
| *G08G 1/005* | (2006.01) |
| *G08G 1/16* | (2006.01) |
| *G09B 21/00* | (2006.01) |

(52) U.S. Cl.
CPC ........... *G09B 21/007* (2013.01); *G08B 7/066* (2013.01); *G08G 1/005* (2013.01); *G08G 1/166* (2013.01); *G09B 21/008* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 10,403,129 B1 * | 9/2019 | Suarez | G08B 6/00 |
| 2017/0252256 A1 * | 9/2017 | Henshue | E01C 5/16 |

* cited by examiner

*Primary Examiner* — Christopher Braniff
(74) *Attorney, Agent, or Firm* — Ansari Katiraei LLP; Arman Katiraei; Sadiq Ansari

(57) ABSTRACT

An interactive warning pad provides static tactile feedback with a raised set of knobs over the interactive warning pad surface to notify users of a potential hazard. The interactive warning pad also provides enhanced or different sensory feedback to identify a specify type of hazard that the interactive warning pad is intended to protect against and different states associated with the hazard. The interactive warning paid includes a covering with the raised set of knobs. The knobs have translucent tops and lighting elements are positioned under the raised knobs. A controller controls different illuminations of the lighting elements in response to different monitored states of the hazard with the different illuminations identifying the hazard and the hazard state. The interactive warning pad may also include vibration motors, a speaker, and/or a wireless transceiver for additional sensory feedback that identifies the specific type of hazard and hazard state.

20 Claims, 9 Drawing Sheets

INTERACTIVE WARNING PAD FOR ENHANCED USER FEEDBACK

BACKGROUND

Warning pads or truncated dome mats were developed to assist the visually impaired. The warning pads were developed in compliance with government statutes (e.g., the Americans with Disabilities Act) and include static, stationary, and/or non-interactive surfaces that provide tactile notice to pedestrians that they are approaching a curb, intersection, surface level change, potential hazard, or other change in the walking surface. For instance, a typical warning pad includes a raised set of hardened knobs across a surface that provide sensory feedback of an upcoming change in the walking surface. This design and the static functionality of the warning pad have remained the same for decades.

There is a need to incorporate modern technology into the warning pads to make them interactive, provide different sensory feedback, and convey different information. In particular, there is a need to improve and enhance existing warning pads so that they may provide better assistance to persons with disabilities and may provide enhanced or improved experiences for visitors and residents alike.

DETAILED DESCRIPTION OF PREFERRED EMBODIMENTS

The following detailed description refers to the accompanying drawings. The same reference numbers in different drawings may identify the same or similar elements.

Disclosed is an interactive warning pad for enhanced user feedback. The enhanced user feedback includes different sensory feedback besides the static tactile feedback provided by a raised set of knobs over the warning pad surface. The different sensory feedback may be conveyed visually, audibly, via different tactile feedback, and/or wirelessly to user devices. Accordingly, the interactive warning pad exceeds the standardized compliance set forth in existing governmental regulations such as the Americans with Disabilities Act (ADA) by providing better multi-sensory assistance to persons with various disabilities and adapts the warning pad for uses that extend to visitors (e.g., tourists) and/or persons without disabilities.

The raised set of knobs associated with a traditional warning pad merely notifies the user of a potential hazard. The enhanced user feedback provided by the interactive warning pad provide additional information about the potential hazard including state changes associated with the potential hazard. The enhanced user feedback may also assist visitors and/or residents with real-time information without the need for the people to check their own personal devices or in areas where there is no data network availability. In some embodiments, the interactive warning pad may communicate directly with devices of individuals in order to convey different personalized information that is of relevance to each individual. The enhanced feedback may assist in traffic control or event management by replacing or supplementing guidance provided by traffic control personnel and by directing pedestrian traffic away or around areas with congested or heavy vehicle traffic.

Figure 1:
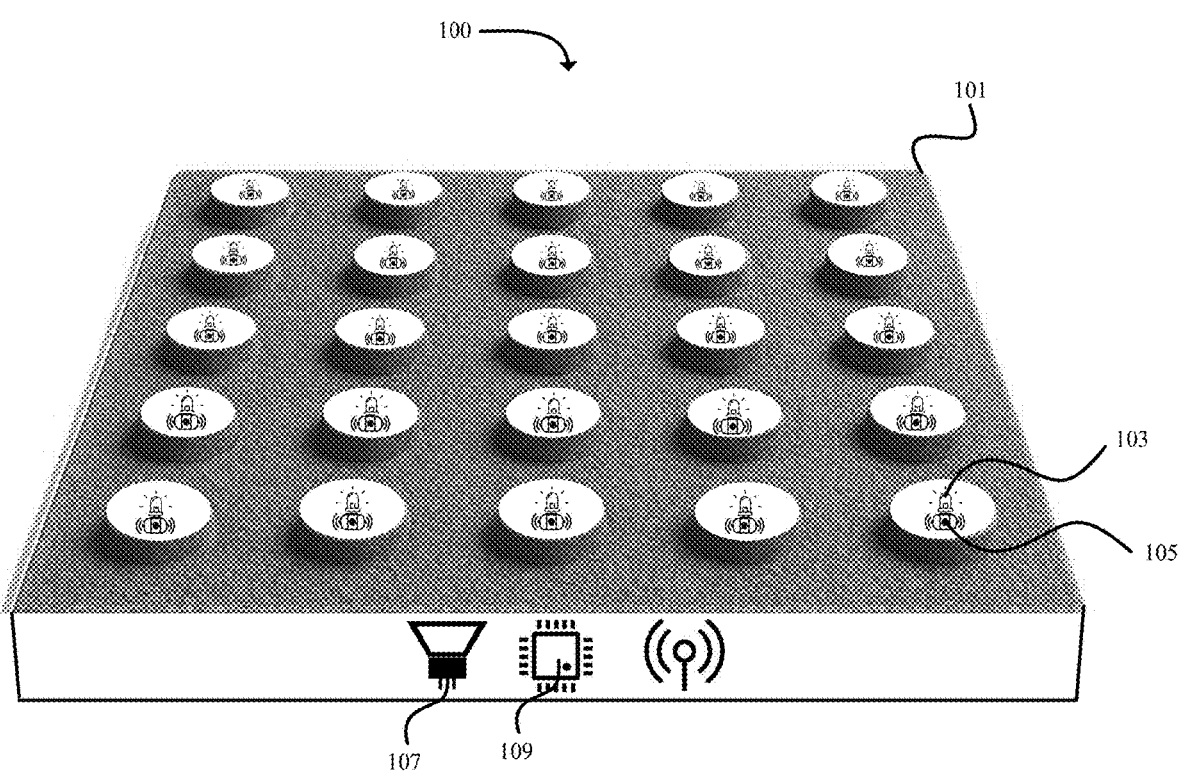
FIG. 1 illustrates an example components of an interactive warning pad in accordance with some embodiments presented herein.

FIG. 1 illustrates an example components of interactive warning pad 100 in accordance with some embodiments presented herein. Interactive warning pad 100 is integrated or installed into a ground surface to provide warning or notice of a potential hazard or of the ground surface changing.

Interactive warning pad 100 includes an upper layer or covering 101, lighting elements 103, vibration motors 105, speaker 107, and controller 109. In some embodiments, interactive warning pad 100 includes fewer sensory feedback components (e.g., lighting elements 103 without vibration motors 105). In some embodiments, interactive warning pad 100 includes additional components such pressure sensors, a camera, or motion sensors that provide inputs that change or control the operation of interactive warning pad 100.

Covering 101 may be made of a durable, weather-resistant, and hardened material. For instance, covering 101 may be made of cast iron, stainless steel, composites, hardened plastics, high-density polyethylene (HDPE), reinforced fiberglass polymers, urethane, and/or a combination of these and other materials. Covering 101 includes a raised set of translucent or clear knobs, bumps, or domes that are distributed across the surface. Each knob may have a height between 0.1 and 1 inch and a base diameter between 0.5 and 1.5 inches. Each knob may have a frustum, cylindrical, diamond, or cubic shape.

Lighting elements 103 may be inserted under each knob and may be illuminated with different colors. Lighting elements 103 may include light emitting diodes (LEDs) or low resolution micro displays that are controlled by controller 109. Specifically, controller 109 may control the color and illumination of each lighting element 103 and may synchronize the color and illumination of lighting elements 103 to present graphics, text, or other messaging across the surface of interactive warning pad 100.

Vibration motors 105 may be inserted under each knob or placed under different regions of interactive warning pad 100. For instance, a first vibration motor 105 may be placed under the knobs associated with the top left quadrant, a second vibration motor 105 may be placed under the knobs associated with the bottom left quadrant, a third vibration motor 105 may be placed under the knobs associated with the top right quadrant, and a fourth vibration motor 105 may be placed under the knobs associated with the bottom left quadrant. In any configuration, vibration motors 105 provide dynamic tactile feedback by vibrating in different patterns or directions. For instance, vibration motors 105 may vibrate in a left to right pattern to convey a first message (e.g., clear to walk to the right) or back to front pattern to convey a second message (e.g., clear to walk forward). Similarly, changing the vibration frequency may be used to convey different information.

Speaker 107 is a sound emitting device provided to audibly communicate messages to pedestrians. Similar to cross-walk audible alerts, sounds or words output from speaker 107 may be used to notify the visually impaired on when it is safe to cross an intersection or to wait. Moreover, speaker 107 may provide audible communication of street names and/or headings (e.g., north, south, east, west, northeast, etc.).

Controller 109 is a circuit or processor with programmable logic for controlling the operation of lighting elements 103, vibration motors 105, and/or speaker 107. Controller 109 may include memory or non-volatile storage for storing configuration data and/or different messaging that controller 109 conveys via lighting elements 103, vibration motors 105, and/or speaker 107 at different times or in response to different inputs or triggering events.

Controller 109 is connected to a power supply and includes a wireless transceiver for communicating with nearby user devices and/or for receiving configuration or control data from an administrative controller. In some embodiments, the transceiver includes a Bluetooth, Ultra-Wideband (UWB), and/or WiFi radio for short-range wireless communication. In some embodiments, the transceiver includes a Long-Term Evolution (LTE) or Fifth Generation radio for long-range wireless communication.

In some embodiments, controller 109 is connected to a cross-walk signal or traffic-control signal via a wired or wireless connection. In some such embodiments, controller 109 receives messaging from the cross-walk signal or the traffic-control signal that controller 109 converts to provide different sensory feedback via lighting elements 103, vibration motors 105, and/or speaker 107. For instance, the different sensory feedback may provide pedestrians with more visible, audible, or tactile notice of when they may cross a street or when they are to wait at the intersection.

In some embodiments, controller 109 connects to an administrative controller using the wireless transceiver. In some such embodiments, the wireless transceivers of neighboring controllers 109 form a mesh network by which all controllers 109 of the mesh network receive signaling from the administrative controller. The administrative controller may include a device or server at a traffic control center or a city management center. The administrative controller may direct the operation of the connected set of controllers 109 for different interactive warning pads 100 and may be used to coordinate the information conveyed by the connected set of controllers 109 across the different interactive warning pads 100.

Interactive warning pads 100, by operation of controllers 109 and the wireless transceiver, provide a remotely accessible interface that the administrative controller may use to remotely configure and/or program the operation of interactive warning pads 100. Interactive warning pads 100 may be configured to provide different messaging including advertising or information for business, attractions, events, public transportation, and/or other information that is geographically relevant for the different locations of different interactive warning pads 100. The administrative controller may also control the operation of multiple interactive warning pads 100 for traffic management or coordinated operation across the multiple interactive warning pads 100.

Figure 2:
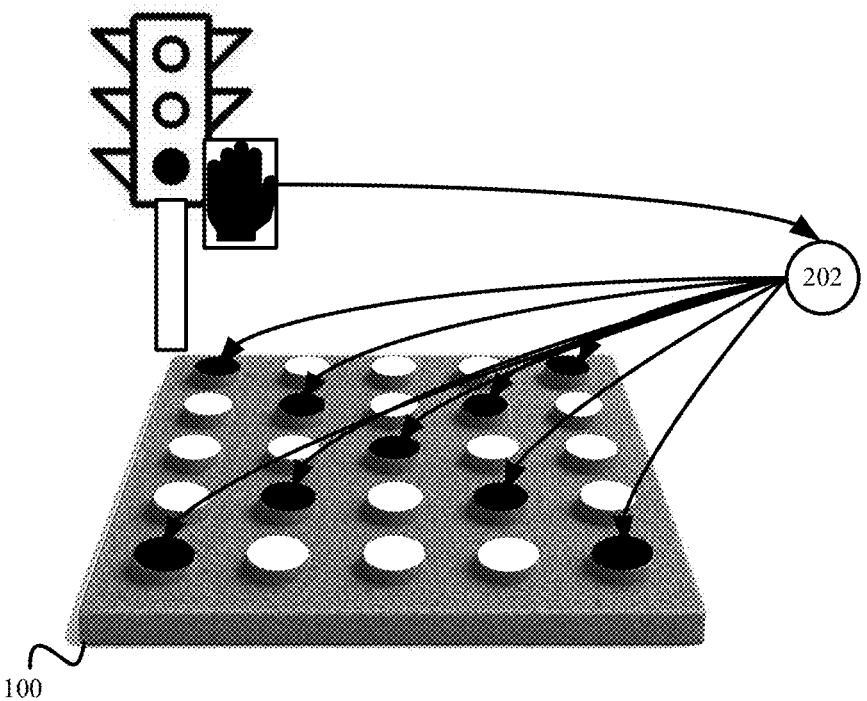
FIG. 2 illustrates an example of enhanced sensory feedback provided by the interactive warning pad in accordance with some embodiments presented herein.
Figure 2:
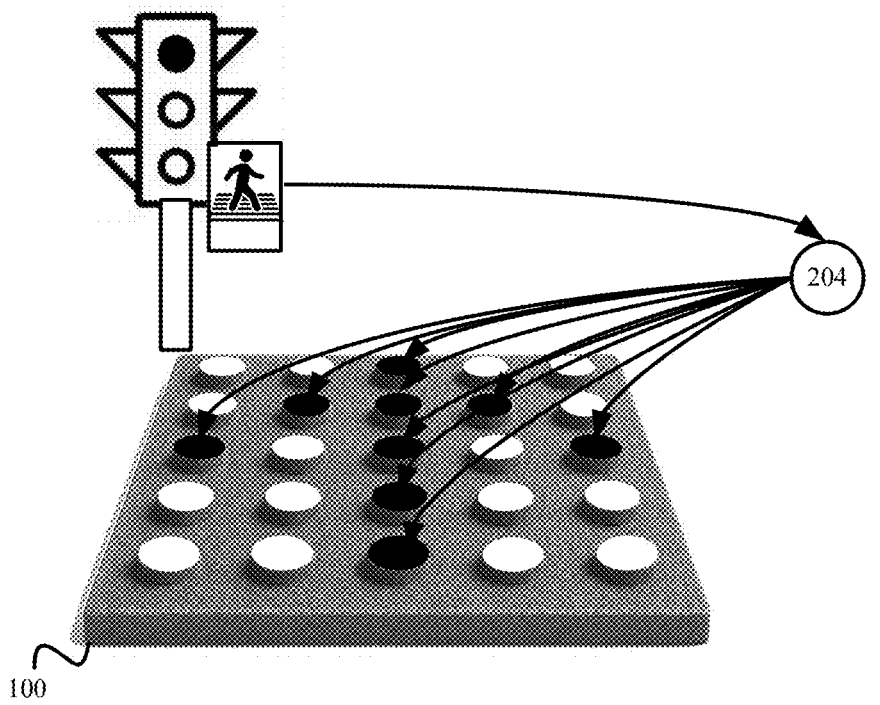

FIG. 2 illustrates an example of enhanced sensory feedback provided by interactive warning pad 100 in accordance with some embodiments presented herein. Lighting elements 103 associated with a first set of knobs of interactive warning pad 100 may illuminate (at 202) with a first color (e.g., red) and/or with a first graphic or message to notify pedestrians that it is not safe to cross or to wait at the intersection. In some embodiments, lighting elements 103 associated with the first set of knobs may flash the first color and/or first graphic or message for greater visibility. Controller 109 may coordinate the illumination of lighting elements 103 in response to signaling or messaging that controller 109 receives from a traffic control signal and/or crosswalk signal.

Controller 109 may change the sensory feedback provided through interactive warning pad 100 in response to the traffic control signal and/or crosswalk signal changing state. For instance, interactive warning pad 100 may illuminate (at 204) with a second color (e.g., green) and/or with a second graphic or message to notify pedestrians that is safe to cross the intersection. The second graphic may include animated or moving arrows that instruct pedestrians on the direction with which they may safely cross a street. Controller 109 may flash the second color and/or second graphic or message for greater visibility.

The visually impaired may be unable to differentiate detail from a crosswalk signal, but the larger illumination, flashing, and/or animated visuals of interactive warning pad 100 are more noticeable. Moreover, the different sensory feedback provided by interactive warning pad 100 for different states of a potential hazard or change in surface condition better assist the visually impaired and/or persons with disabilities in determining what the hazard or change in surface condition is and when and how to safely navigate that hazard or change in surface condition.

Interactive warning pad 100 may provide additional or alternative sensory feedback to better assist the visually impaired and/or persons with other disabilities or accommodate persons with different disabilities. For instance, noise from crosswalk signals (e.g., chirping sound to indicate that it is safe to cross) may be hard to hear or differentiate which direction is safe to cross in a noisy city environment. Moreover, the blind may be unable to differentiate the illumination of interactive warning pad 100 during bright daylight hours or at night when other nearby lights or displays may confuse the visually impaired. Accordingly, interactive warning pad 100 may use vibration motors 105 to provide the additional or alternative sensory feedback.

Figure 3:
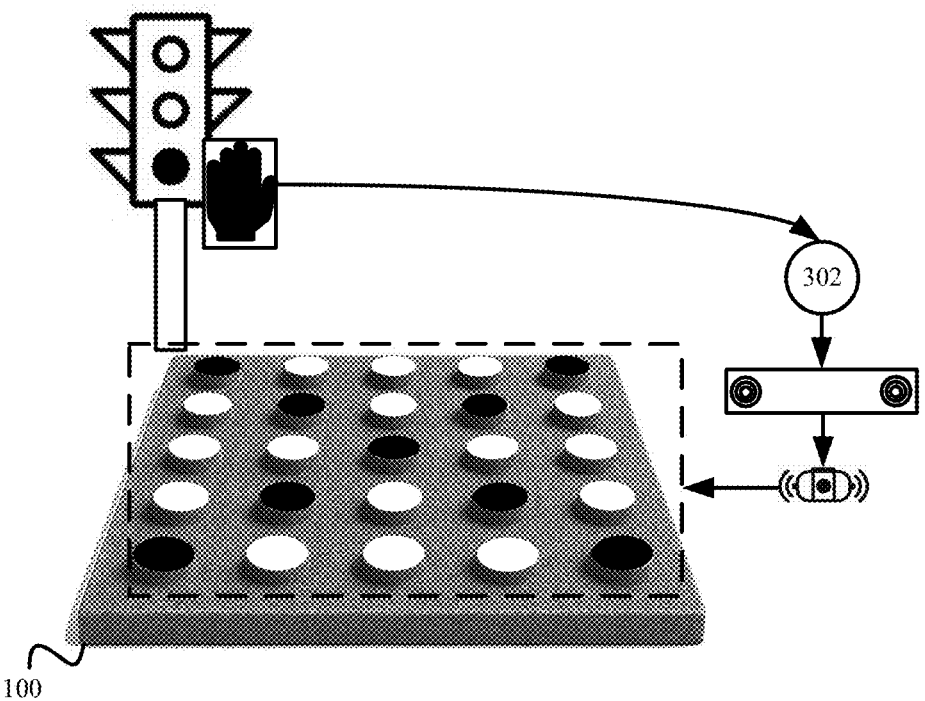
FIG. 3 illustrates an example of additional or alternative sensory feedback provided by the interactive warning pad in accordance with some embodiments presented herein.
Figure 3:
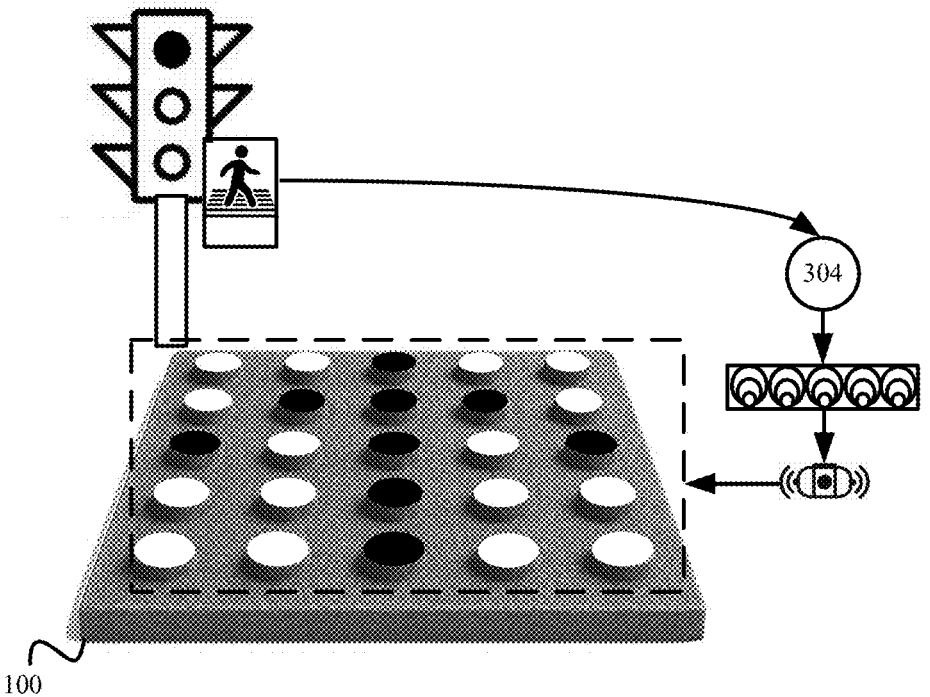

FIG. 3 illustrates an example of additional or alternative sensory feedback provided by interactive warning pad 100 in accordance with some embodiments presented herein. Controller 109 may activate the knobs of interactive warning pad 100 to vibrate (at 302) with a first pattern in order to notify pedestrians when it is not safe to cross. For instance, vibration motors 105 may vibrate the knobs on and off or in a direction away from the street when it is unsafe to cross. Controller 109 may then change the vibration (at 304) from the first pattern to a second pattern when it is safe to cross. For instance, vibration motors 105 may vibrate (at 304) the knobs continuously to indicate that it is safe to cross and may adjust the vibration frequency to indicate the amount of time that is left to cross the street. In some embodiments, the second vibration pattern may indicate the direction across the intersection that is safe to cross. For instance, the knobs may vibrate left to right to indicate that it is safe to cross to the right and may vibrate (at 304) from back to front to indicate that it is safe to cross in a perpendicular direction.

Figure 4:
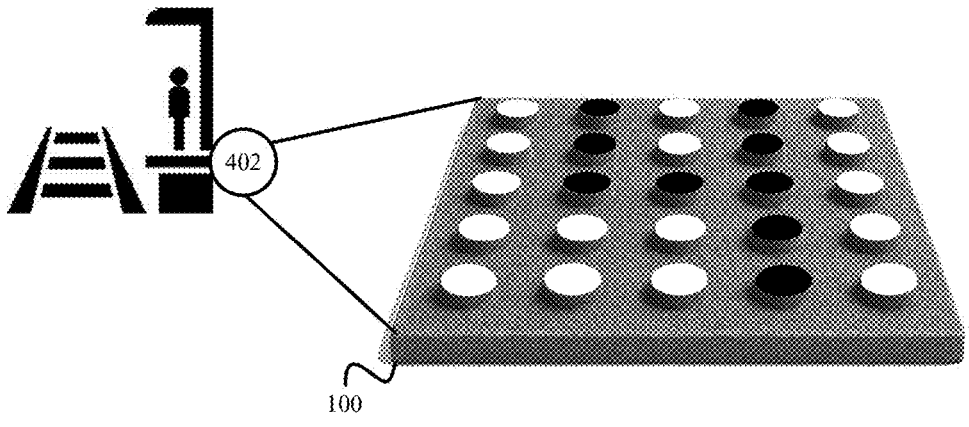
FIG. 4 illustrates an example of adapting the various sensory feedback provided by interactive warning pad to provide real-time information in accordance with some embodiments presented herein.
Figure 4:
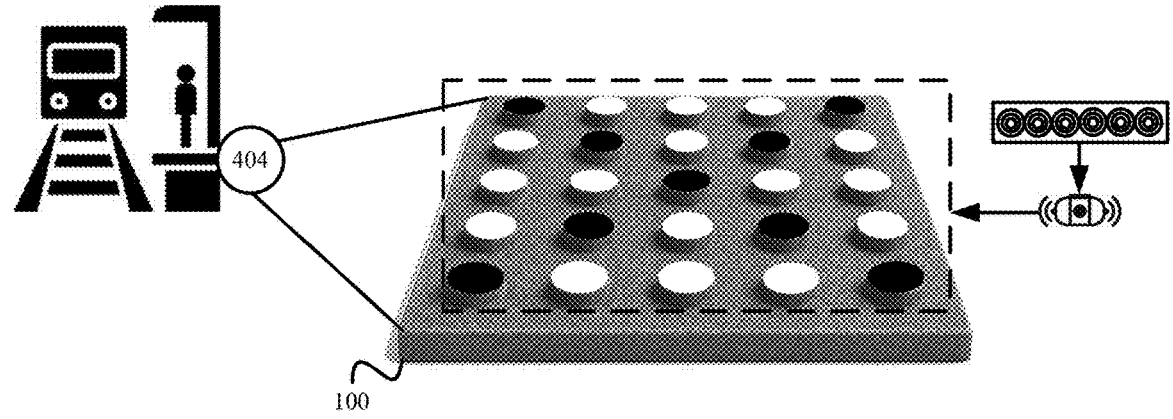
Figure 4:
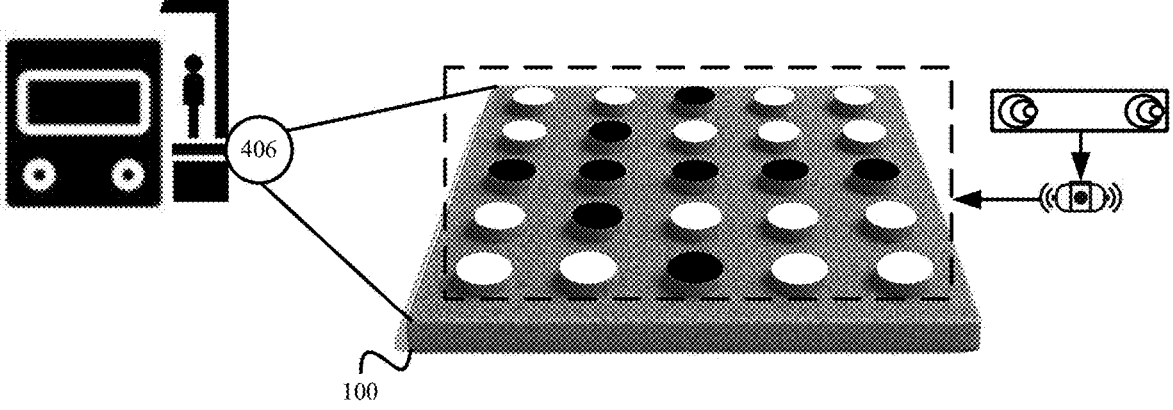

In addition to assisting persons with disabilities as was the original intent behind traditional warning pads, interactive warning pads 100 may be used to provide real-time information that may assist tourists and/or other pedestrians in getting around. FIG. 4 illustrates an example of adapting the various sensory feedback provided by interactive warning pad 100 to provide real-time information in accordance with some embodiments presented herein.

Interactive warning pad 100 is placed on a train platform. Interactive warning pad 100 illuminates (at 402) to notify nearby users when the train is expected to arrive. For instance, interactive warning pad 100 may receive positional information from the train, a train monitoring server, or data from positional sensors along the train tracks. Interactive warning pad 100 may illuminate (at 402) to indicate the number of minutes before the train arrives.

As the train approaches the platform, interactive warning pad 100 changes (at 404) the sensory feedback to instruct users to move away from interactive warning pad 100. For instance, interactive warning pad 100 may illuminate a different pattern across the knobs, may vibrate the knobs in a particular pattern at a particular frequency, and/or may provide audible alerts from the integrated speaker.

Once the train comes to a stop at the platform and it is safe to board, interactive warning pad 100 changes (at 406) the sensory feedback to instruct users that they may board the train. Changing (at 406) the sensory feedback may again include changing the illumination of the knobs, changing the vibration pattern and/or frequency, and/or changing the audible prompts issued from the integrated speaker.

Interactive warning pad 100 may provide other real-time or pertinent information to users. For instance, tourists may be unaware of locations for public transit (e.g., buses, subway stations, ride-share pick locations, etc.) or may not be familiar with which lines are nearby. Interactive warning pad 100 may present the public transit location information in different forms. For instance, when it is not safe to cross, interactive warning pad 100 may present a map of the user's current location and the nearby locations of different public transit lines or stops. Such a map may be generated when the knobs are integrated with displays that are capable of rendering multiple pixels and the displays present different parts of the map. Alternatively, interactive warning pad 100 may present directions to the nearest public transportation (e.g., move one block in a first direction). Interactive warning pad 100 may present the directions when the knobs are integrated with displays or when integrated warning pad 100 has a large number of knobs that collectively may provide a rudimentary graphic of the user location and the location of a nearest stop. In some embodiments, the interactive warning pad 100 may provide visitors with locations or directions to nearby landmarks, events, public restrooms, traffic information, etc. In some other embodiments, interactive warning pad 100 may periodically display advertisements. The advertisements may be for nearby businesses. A business may enter into an agreement to pay a certain sum to have their advertisements displayed at certain times of day across interactive warning pads 100 at locations of the business's choosing (e.g., interactive warning pads 100 on the same block as the business). Advertisers may upload advertisements of a particular resolution or size to the administrative controller, and the administrative controller may distribute the advertisements to interactive warning pads 100 at the selected locations.

The administrative controller may also coordinate the messaging presented across a set of interactive warning pads 100. The coordinated messaging may be used to direct or manage pedestrian traffic for events, emergency situations, and/or other scenarios in which traffic control personnel would otherwise have to be deployed to manage traffic and crowds. For instance, the set of interactive warning pads 100 may be used to direct pedestrian traffic away from streets that have heavy vehicle traffic, thereby allowing the vehicle traffic to flow more freely without constant interruptions to allow pedestrian traffic to cross those same streets.

Figure 5:
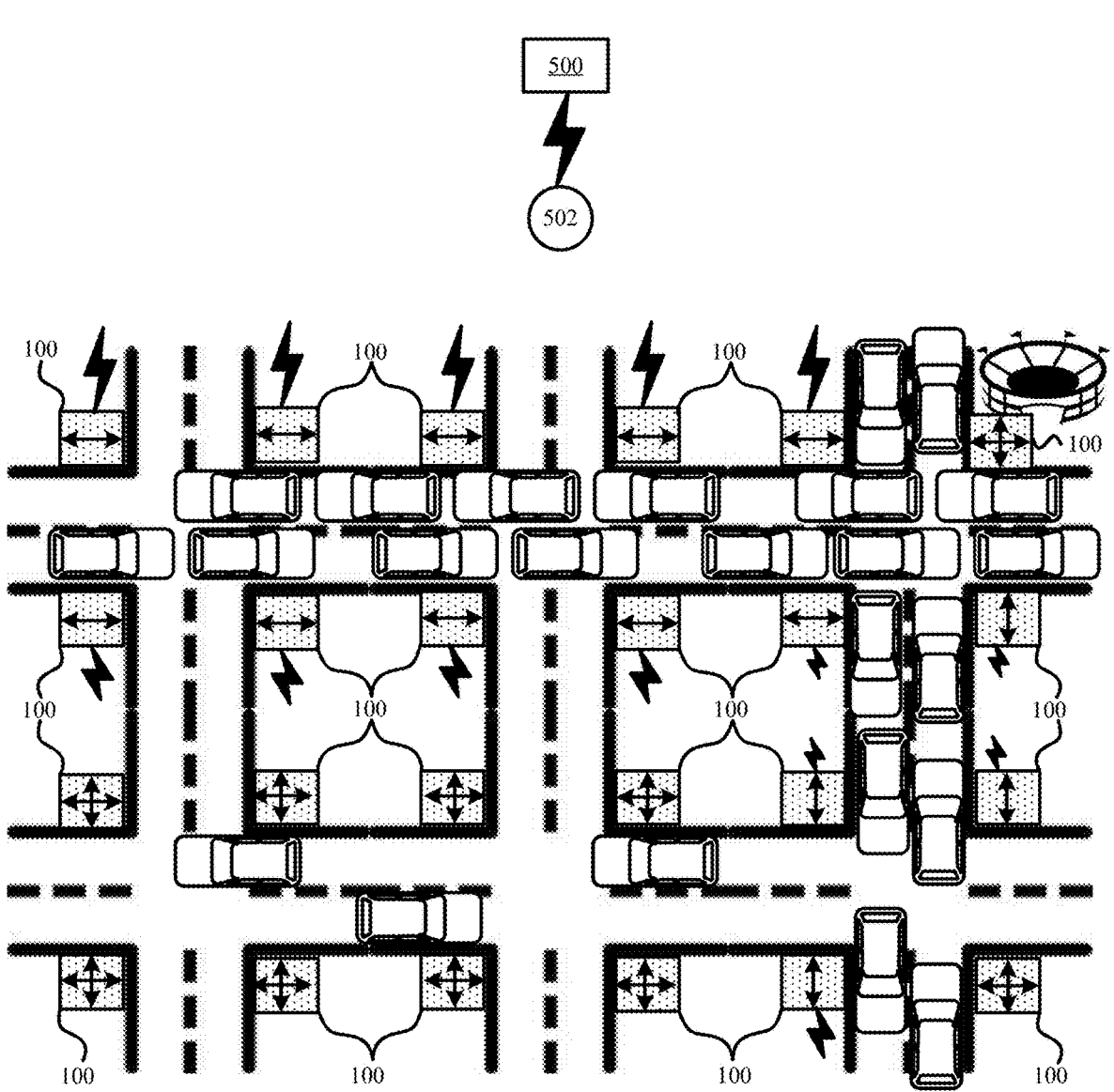
FIG. 5 illustrates an example of coordinating the sensory feedback provided by a set of interactive warning pads in accordance with some embodiments presented herein.

FIG. 5 illustrates an example of coordinating the sensory feedback provided by a set of interactive warning pads 100 in accordance with some embodiments presented herein. Administrative controller 500 coordinates interactive warning pads 100 to direct pedestrian traffic away from streets with heavy vehicle traffic. For instance, an event may take place that causes large crowds to gather at a site (e.g., stadium). The heavy vehicle traffic may be caused by vehicles attempting to park at nearby lots, ordinary vehicle traffic in the area, and/or ride-sharing or other vehicles driving users to the site.

Administrative controller 500 issues (at 502) messaging to interactive warning pads 100 that causes interactive warning pads 100 to coordinate and direct the pedestrian traffic away and around the streets with heavy vehicle traffic. For instance, interactive warning pads 100 may restrict pedestrian movement towards the street with the heavy vehicle traffic by providing sensory feedback that guides pedestrians to the site via side streets or that prohibits the crossing of the streets with heavy vehicle traffic. The sensory feedback may include presenting arrows that direct the pedestrians along the desired streets and/or wording that says pedestrian traffic is prohibited on certain streets while the event is taking place.

The coordinated messaging of the interactive warning pads 100 may also be used to assist first responders and emergency personnel. For instance, a traffic accident may occur at an intersection. The first responders may notify administrative controller 500 of the traffic accident, and administrative controller 500 may temporarily control interactive warning pads 100 at or near the intersection where the collision occurred to direct pedestrian traffic away or around the scene.

In some embodiments, the wireless transceiver of interactive warning pad 100 may broadcast or transmit wireless messaging to further assist pedestrians. The wireless messaging may be customized to provide specific warnings of the hazards or changing environment ahead. In some such embodiments, interactive warning pads 100 may work in conjunction with an application that runs on user devices. The application may be configured to listen for, receive, and/or present the wireless messaging when in range of the wireless transceiver of interactive warning pad 100. The application may present the wireless messaging in the form of a textual message or as an audio message that is played through a speaker of the user device or a connected headset. In some other such embodiments, interactive warning pads 100 may work in conjunction with enhanced assistive devices used by persons with disabilities. For instance, a short-range wireless radio may be integrated in the white cane used by the visually impaired. The radio within the white cane may receive the wireless messaging transmitted from a nearby interactive warning pad 100 and may provide additional sensory feedback (e.g., vibration or sound) beyond the tactile feedback of the raised knobs to notify the user that they have approached a potential hazard. The wireless messaging and sensory feedback may indicate the potential hazard. For instance, different vibrations of the white cane may be used to signal when the user is approaching stairs, a crosswalk, a public transportation platform or stop, or other places where there is a change in the walking path. As another example, the enhanced assistive devices may include eyeglasses, earpieces, or other wearable device with a short-range radio (e.g., Bluetooth, UWB, etc.) and a speaker. The enhanced assistive devices may receive the wireless messaging from a nearby interactive warning pad 100 and may play a sound or audio message to indicate a potential hazard (e.g., stairs, crosswalk, platform, etc.). For instance, the white cane used by the visually impaired may be integrated with a short-range wireless radio to receive the assistive messaging and a speaker to play a sound that notifies the user of the specific potential hazard identified by the assistive messaging and/or a current state associated with the specific potential hazard (e.g., "crosswalk-do not cross").

Figure 6:
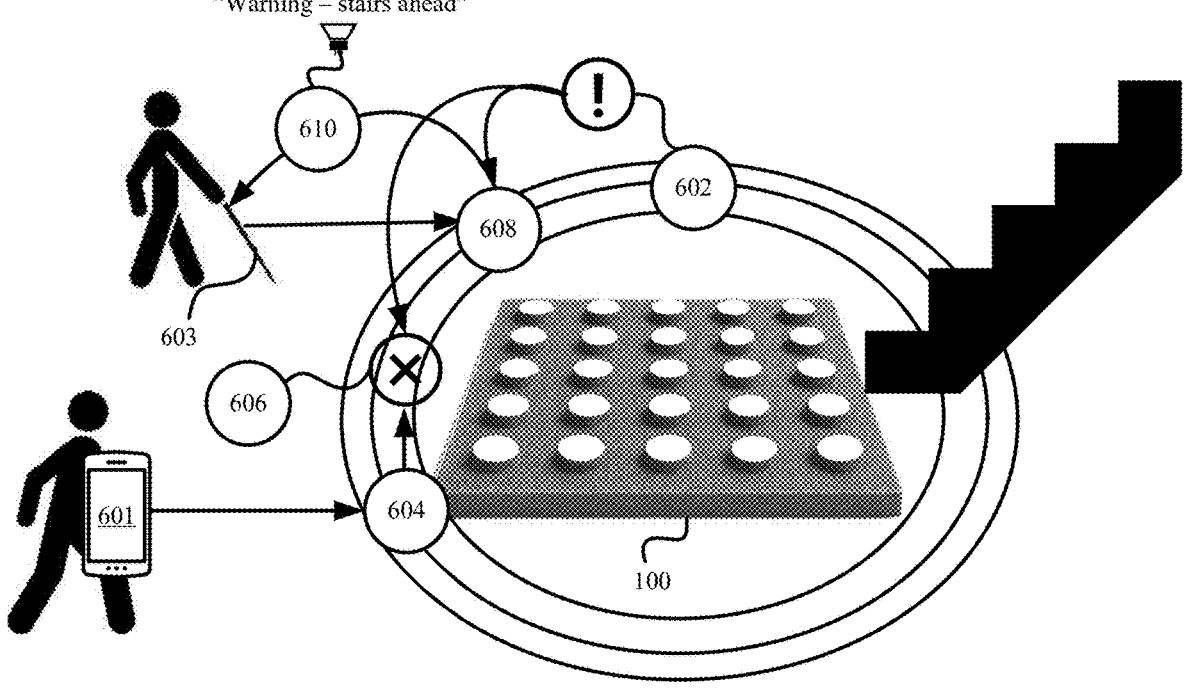
FIG. 6 illustrates an example of providing wireless messaging for enhanced assistive identification of potential hazards in accordance with some embodiments presented herein.

FIG. 6 illustrates an example of interactive warning pad 100 providing wireless messaging for enhanced assistive identification of potential hazards in accordance with some embodiments presented herein. Interactive warning pad 100 is placed to provide notice of a nearby hazard (e.g., stairs) that persons with disabilities may be unable to detect on their own. Interactive warning pad 100 is configured to continually broadcast (at 602) a wireless message that identifies the potential hazard. For instance, the wireless transceiver of interactive warning pad 100 may wirelessly disseminate the message every second with or without an identifier that identifies the interactive warning pad 100 sending the message. The message is disseminated over a short distance such that it is detectable by devices that are positioned over or within a few feet of interactive warning pad 100. The message may be encoded such that it is received and/or readable by a specific assistive application or a user device that is configured to receive and decode the wireless assistive messaging from interactive warning pad 100.

First user device 601 runs without the specific assistive application and/or is not configured to receive the assistive messaging. First user device 601 enters (at 604) in range of interactive warning pad 100. First user device 601 may not receive or present (at 606) the assistive message if it is not running the specific assistive application or not configured to receive the assistive messaging. Alternatively, first user device 601 may receive the wireless message and be unable to decode or present the message or may discard the message as a result of not being configured to present the assistive messages from interactive warning pad 100.

Second user device 603 runs the specific assistive application and/or is configured to receive the assistive messaging. Second user device 603 enters (at 608) in range of interactive warning pad 100. Second user device 603 receives the assistive message that is broadcast or transmitted from interactive warning pad 100, and generates (at 610) sensory feedback for the specific hazard associated with interactive warning pad 100. For instance, the sensory feedback may be in the form of an audible notification that notifies the user of a crosswalk, stairs, a platform or edge, and/or other potential hazards. The sensory feedback may also provide state information regarding the specific hazard, wherein the state information may notify the user on safely navigating the hazard.

Second user device 603 may present the assistive message once despite repeated broadcasts from interactive warning pad 100 based on the interactive warning pad 100 identifier issued with the assistive message. In particular, second user device 603 presents the first assistive message it receives from each interactive warning pad 100, determines the pad identifier associated with the presented assistive message, and discards the same assistive messages with the same pad identifier.

In some embodiments, interactive warning pad 100 may transmit different assistive messages at different times. In some such embodiments, each different assistive message may be associated with a different message identifier. The user device may present a single instance of an assistive message by tracking the different message identifier associated with each received assistive message. For instance, interactive warning pad 100 may disseminate a first message 10 times over a 10 second duration to notify users when it is not safe to cross and may disseminate a second message 15 times over a subsequent 15 second duration to notify users when it is safe to cross. The first message and the second message may be associated with different message identifiers so that user devices configured to receive and present the messages do not repeatedly present the same received message.

In some embodiments, the outer surface or tactile feedback provided by the knobs of interactive warning pad 100 may be adjusted or removed when the wireless assistive messaging is provided. For instance, a flat interactive warning pad 100 may be positioned in front of an escalator. The wireless assistive messaging may notify users of the escalator without the tactile feedback associated with walking on and over the knobs.

Interactive warning pads 100 have a programmable architecture that may be leveraged to provide customized or personalized messaging to different in-range users. The administrative controller may be used to configure or program each interactive warning pad 100 with safety information, location-specific information, geographically relevant advertisements, and/or other messaging. The safety information may include information about a specific hazard that interactive warning pad 100 is positioned to provide notice for and/or different states of the specific hazard. The location-specific information may include information about nearby public transportation. The geographically relevant advertisements may include advertisements for businesses that are within a one block radius of interactive warning pad 100. Other messaging may include real-time weather or traffic information, information about nearby events, and/or messaging that changes based on the time-of-day (e.g., coffee shop advertisements in the morning and restaurant advertisements in the afternoon).

Users may select which information they wish to receive from interactive warning pads 100. For instance, users with disabilities may wish to receive the safety information and tourists may wish to receive the location-specific information and/or geographically relevant advertisements. Users may configure the assistive application on their mobile devices to specify which messaging from interactive warning pads 100 is of interest to them and should be presented on their mobile devices.

Figure 7:
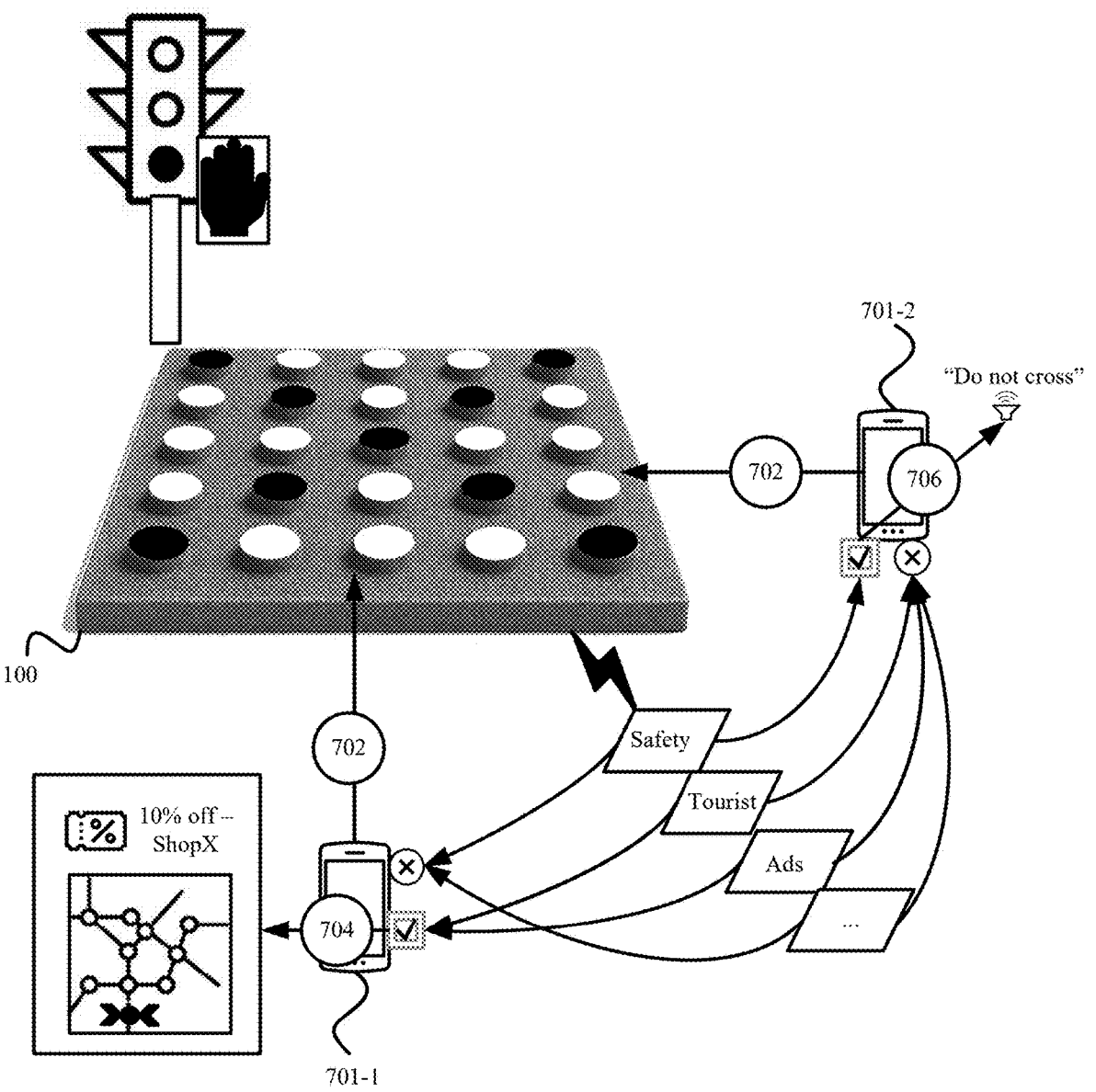
FIG. 7 illustrates an example of providing different messaging to different user devices in accordance with some embodiments presented herein.

FIG. 7 illustrates an example of interactive warning pads 100 providing different messaging to different user devices in accordance with some embodiments presented herein. First user device 701-1 may be used by a tourist and the assistive application running on first user device 701-1 may be configured to receive wireless messaging about public transportation, food, and attractions nearby. Second user device 701-2 may be used by a visually impaired person and the assistive application running on second user device 701-2 may be configured to receive wireless messaging about potential hazards.

First user device 701-1 and second user device 701-2 enter (at 702) into wireless range of interactive warning pad 100. Interactive warning pad 100 periodically or continuously broadcasts different wireless messaging associated with its location.

First user device 701-1 is configured to receive and present (at 704) a first set of messages broadcast by interactive warning pad 100 and may discard other messages broadcast by interactive warning pad 100. The first set of messages identify a nearby public transportation stop and nearby restaurants that advertise through the interactive warning pad 100 messaging.

Second user device 701-2 is configured to receive and present (at 706) a second set of messages broadcast by interactive warning pad 100 and may discard other messages broadcast by interactive warning pad 100. The second set of messages notify the user of second user device 701-2 when it is safe and unsafe to cross an intersection.

The wireless messaging transmitted from interactive warning pads 100 may be configured to change with the time of day, day of week, or in response to updates from the administrative controller. In some embodiments, the wireless messaging may include targeted advertisements. For instance, a first user may configure their assistive application and/or device with preferences for coffee and tea shops and a second user may their assistive application and/or device with preferences for clothing stores. The same interactive warning pad 100 may distribute advertisements for nearby coffee and tea stops to the first user device and coupons, promotions, or advertisements for nearby clothing stores to the second user device.

As the amount of messaging that may be distributed from interactive warning pad 100 changes, interactive warning pad 100 may change from broadcasting all messages to a customized message delivery node. For instance, each interactive warning pad 100 may be configured to broadcast assistive information to persons with disabilities. However, with respect to messaging for nearby businesses, real-time information, advertisements, and/or other information, each interactive warning pad 100 may be configured to provide customized messaging to user devices that request that information. The user devices that request such information from interactive warning pad 100 may be configured to establish a wireless connection (e.g., a Bluetooth connection) when in range with interactive warning pad 100. Through the wireless connection, the user device may transmit a set of preferences for desired information to interactive warning pad 100 and interactive warning pad 100 processes the request to respond with personalized messaging that matches or satisfies the set of preferences. For instance, the user device may be configured to provide notifications of nearby restaurants. When the user device enters in range of and connects to a first interactive warning pad 100 at a first location with no restaurants in the immediate block, the user device sends a message requesting information about nearby restaurants. First interactive warning pad 100 replies with no messaging or a message that there are no nearby restaurants. When the user device enters in range of and connects to a second interactive warning pad 100 at a second location with two restaurants in the immediate block, the user device against sends the message requesting information about nearby restaurants. Second interactive warning pad 100 replies with messaging and/or information about the two restaurants.

Interactive warning pad 100 may include sensors that further assist persons with various disabilities. For instance, some crosswalks require a user to press a button to signal their intent to cross the street. The visually impaired may have difficulty locating the button. Similarly, a button press is required to summon an elevator. In a stall of multiple elevators, the visually impaired may once again have difficulty locating the button. To enter a secure building, a user may have to locate and ring a door bell or present their credentials before a credential reader. Once again, the visually impaired may have difficultly locating the desired inputs. Accordingly, in some embodiments, interactive warning pad 100 may integrate pressure sensors, geo-fencing, and/or motion sensors to detect the presence of a human and to automatically activate the button for enabling pedestrian right-of-way, summoning an elevator, and/or perform other assistive tasks.

Figure 8:
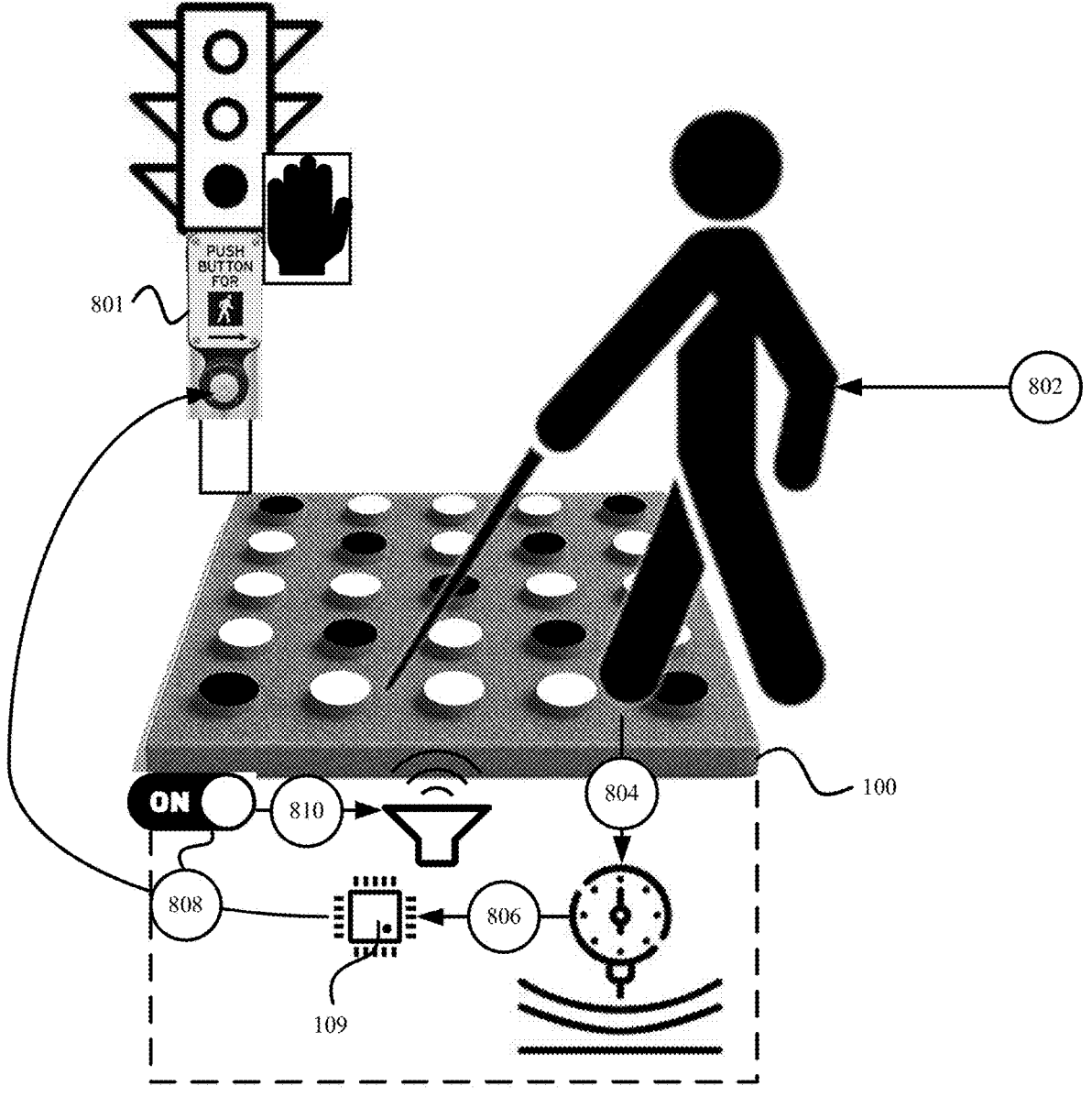
FIG. 8 illustrates example operation of sensor-integrated interactive warning pads in accordance with some embodiments presented herein.

FIG. 8 illustrates example operation of sensor-integrated interactive warning pads 100 in accordance with some embodiments presented herein. Interactive warning pad 100 is located at a crosswalk that includes crosswalk button 801 for activating pedestrian right-of-way to cross the street.

A user walks (at 802) onto interactive warning pad 100. The raised knobs of interactive warning pad 100 provide the tactile feedback that warns the user of the upcoming crosswalk. Additional sensory feedback may be provided by illumination from lighting elements 103, vibration from vibration motors 105, sound from speaker 107, and/or wireless messaging disseminated from the wireless transceiver.

Pressure sensors integrated into interactive warning pad 100 detect (at 804) the weight of the user on the interactive warning pad 100 and further detect that the user has stopped or remains on interactive warning pad 100 while the traffic signal or crosswalk signal is in a particular state (e.g., do not cross). In some embodiments, the pressure sensors are integrated under or as part of each knob. In some other embodiments, one or more pressure sensors are distributed to different regions or quadrants under the interactive warning pad 100 covering. The pressure sensors send (at 806) a signal to controller 109 of interactive warning pad 100 in response to detecting (at 804) the weight of the user and detecting that the user has stopped on interactive warning pad 100. In some embodiments, controller 109 continually polls or monitors the pressure sensors for the detected presence of a human while also monitoring the traffic signal or crosswalk signal state.

Controller 109 activates (at 808) the crosswalk button in response to receiving the signal from the pressure sensors and determining that the traffic signal or crosswalk signal state prohibits the user from crossing the street. An audible queue or other sensory feedback may be provided (at 810) from interactive warning pad 100 to notify the user that the crosswalk button has been activated (at 808).

Once the crosswalk signal changes to establish the pedestrian right-of-way, interactive warning pad 100 provides different sensory feedback that notifies the user that it is safe to cross the street. In some embodiments, controller 109 receives signals or messages from the traffic control light or crosswalk terminal that indicate different traffic control light states and/or crosswalk signal states.

In some embodiments, interactive warning pad 100 may include a camera or motion sensors to detect when a human has walked onto interactive warning pad 100 and/or has stopped on interactive warning pad 100. Controller 109 may activate the crosswalk button or provide other inputs on behalf of the user in response to receiving the camera or motion sensors outputs.

Figure 9:
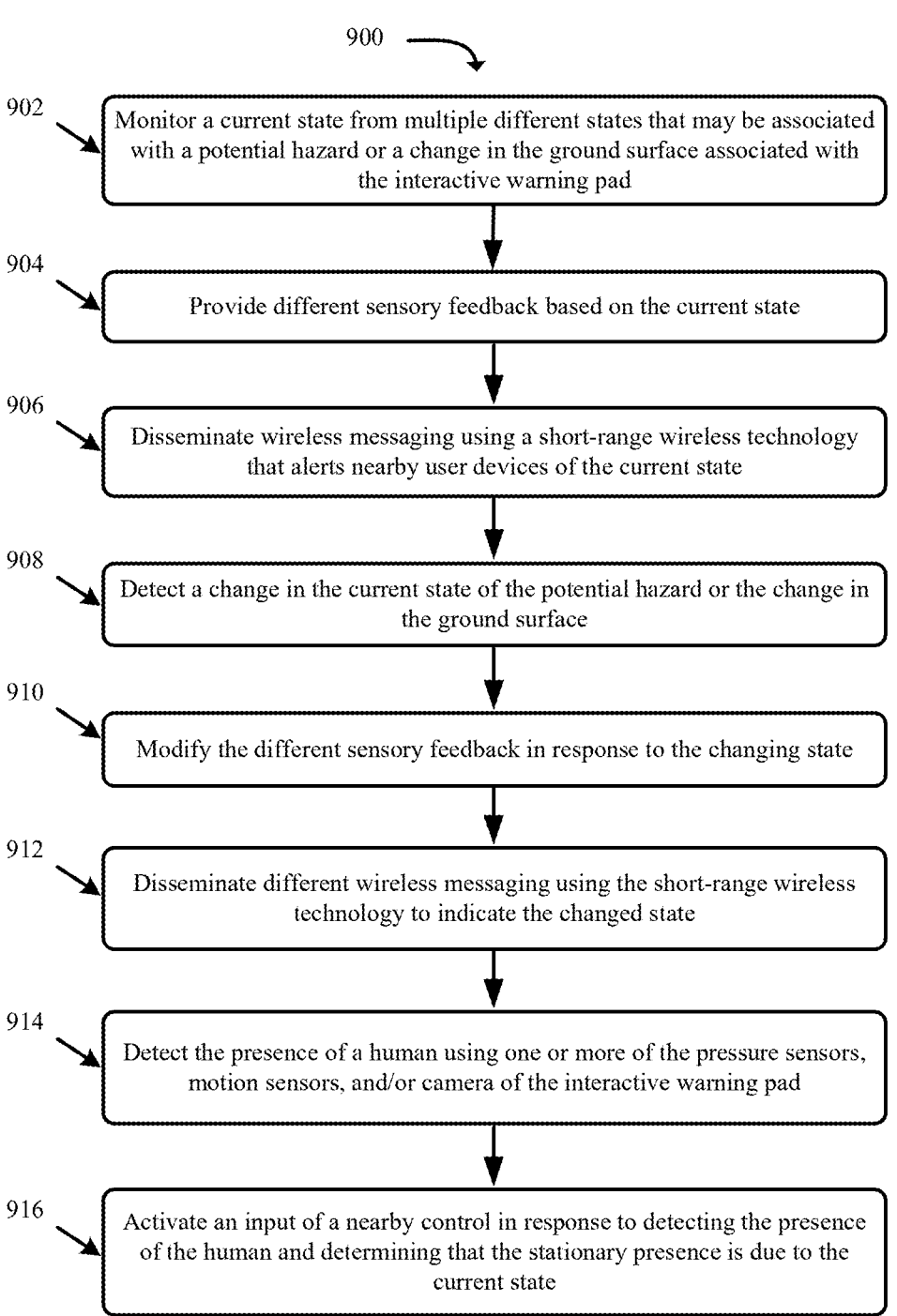
FIG. 9 presents a process for the enhanced sensory feedback provided by the interactive warning pad in accordance with some embodiments presented herein.

FIG. 9 presents a process 900 for the enhanced sensory feedback provided by interactive warning pad 100 in accordance with some embodiments presented herein. Process 900 is implemented by interactive warning pad 100. Interactive warning pad 100 is installed or integrated into the ground surface to provide users notice of a potential hazard or a change in the ground surface.

Process 900 includes monitoring (at 902) a current state from multiple different states that may be associated with the potential hazard or the change in the ground surface. Interactive warning pad 100 monitors (at 902) the current state based on signaling it receives from a device that controls the state changes. For instance, interactive warning pad 100 may be communicably coupled to a traffic control signal, crosswalk signal, loading platform sensor or device, an access entry controller (e.g., a device controlling entry access), and/or other devices.

Process 900 includes providing (at 904) different sensory feedback based on the current state. The different sensory feedback in provided (at 904) in addition to the tactile feedback provided by the raised set of knobs across the surface of interactive warning pad 100. In some embodiments, providing (at 904) the different sensory feedback includes activating a set of the lighting elements to illuminate a pattern or graphic across the surface of interactive warning pad 100 that identifies the current state. Different sets of lighting elements may be illuminated to present different patterns or graphics in response to different monitored states. In some embodiments, providing (at 904) the different sensory feedback includes activating the vibration motors to vibrate with a particular pattern and/or vibration frequency that gives notice of the current state. In some embodiments, providing (at 904) the different sensory feedback includes outputting an audible message or sound from the speaker that gives notice of the current state.

Process 900 includes disseminating (at 906) wireless messaging using a short-range wireless technology (e.g., Bluetooth, UWB, Near-Field Communication, etc.) that alerts nearby user devices of the current state. The wireless message may be broadcast to all nearby devices (e.g., devices within 5 feet of interactive warning pad 100) or to specific nearby devices that establish a wireless connection with interactive warning pad 100 and that request the wireless messaging about the current state. The wireless message may cause user devices to provide additional sensory feedback. For instance, the wireless message may be received by the white cane of a visually impaired individual and the white cane may vibrate with a particular pattern or frequency that alerts the visually impaired individual of the specific potential hazard or change in the ground surface and of the current state associated with the specific potential hazard or change in the ground surface. Additionally, the wireless message may be received by a smartphone, smartglasses, wireless headset or earphones, or other mobile device carried by a user and may cause the mobile device to output audio that alerts the user as to the specific hazard or surface change and the state associated with the specific hazard or surface change.

Process 900 includes detecting (at 908) a change in the current state of the potential hazard or the change in the ground surface. For instance, interactive warning pad 100 may receive messaging that indicates a change to a traffic control signal or crosswalk signal, messaging that indicates arrival or departure of a train or other method of transportation, and/or messaging from an administrative controller for traffic management purposes.

Process 900 includes modifying (at 910) the different sensory feedback in response to the changing state. Modifying (at 910) the different sensory feedback includes changing the illumination pattern, vibration pattern, and/or sounds generated by interactive warning pad 100.

Process 900 includes disseminating (at 912) different wireless messaging using the short-range wireless technology to indicate the changed state. Interactive warning pad 100 may periodically or continuously (e.g., every 1 second) disseminate (at 912) the different wireless messaging while the state remains the same.

Process 900 includes detecting (at 914) the presence of a human using one or more of the pressure sensors, motion sensors, and/or camera of interactive warning pad 100. Detecting (at 914) the presence of the human includes determining that the human has stopped and remains on interactive warning pad 100.

Process 900 includes activating (at 916) an input of a nearby control in response to detecting (at 914) the presence of the human and determining that the stationary presence is due to the current state. For instance, the current state may prevent pedestrians from cross a street or may be associated with an elevator call button that has not been activated or pressed. Activating (at 916) the input of the nearby control may include sending a message that performs the pressing or activation of a crosswalk signal or elevator call button.

The invention claimed is:

1. An interactive warning pad:
   a covering comprising a plurality of raised knobs with translucent tops;
   a plurality of lighting elements positioned under the plurality of raised knobs;
   a wireless transceiver that is communicably coupled to a remote administrative controller; and
   a controller that controls different illuminations of the plurality of lighting elements in response to a plurality of monitored states and messaging received from the remote administrative controller, wherein controlling the different illuminations comprises coordinating at least one of the different illuminations with an illumination of lighting elements of at least a second interactive warning pad at a different location based on the messaging received from the remote administrative controller.

2. The interactive warning pad of claim 1 further comprising:
   a plurality of vibration motors integrated under the covering; and
   wherein the controller further controls different vibration patterns produced by the plurality of vibration motors in response to the plurality of monitored states.

3. The interactive warning pad of claim 1 further comprising:
   a connection established between the interactive warning pad and a traffic control signal or a crosswalk signal, wherein the plurality of monitored states correspond to different states of the traffic control signal or the crosswalk signal that are monitored across the connection.

4. The interactive warning pad of claim 1, wherein the wireless transceiver broadcasts messaging indicating a current state of the plurality of monitored states using a short-range wireless technology.

5. The interactive warning pad of claim 1 further comprising:

a speaker that generates a different audible message for each state of the plurality of monitored states.

6. The interactive warning pad of claim 1, wherein controlling the different illuminations further comprises:

activating a first set of the plurality of lighting elements to illuminate a first pattern or graphic across the plurality of raised knobs in response to a first state of the plurality of monitored states being active; and activating a second set of the plurality of lighting elements to illuminate a second pattern or graphic across the plurality of raised knobs in response to a second state of the plurality of monitored states being active.

7. The interactive warning pad of claim 1, wherein the covering and the plurality of raised knobs are made of a durable, weather-resistant, and hardened material.

8. The interactive warning pad of claim 1 further comprising:

one or more pressure sensors integrated under the covering.

9. The interactive warning pad of claim 8, wherein the one or more pressure sensors detect a presence of a human standing on the interactive warning pad; and wherein the controller issues a signal that activates a crosswalk button or an elevator call button in response to the one or more pressure sensors detecting the presence of the human.

10. The interactive warning pad of claim 1 further comprising:

one or more motion sensors that detect a presence of a human standing on the interactive warning pad.

11. The interactive warning pad of claim 1, wherein controlling the different illuminations further comprises:

presenting a graphic or textual message, that is formed by a different synchronized illumination of the plurality of lighting elements, across a surface of the interactive warning pad, wherein presenting the graphic or textual message comprises mapping one or more pixels of a plurality of pixels for the graphic or textual message to a different lighting element of the plurality of lighting elements.

12. The interactive warning pad of claim 1, wherein coordinating the at least one of the different illuminations comprises:

directing pedestrian traffic to or away from a site based on the illumination of the plurality of lighting elements and the illumination of lighting elements of the second interactive warning pad restricting the pedestrian traffic to a specified path.

13. The interactive warning pad of claim 1, wherein the wireless transceiver is configured to receive a first request from a first user device and a second request from a second user device, and wherein the controller is configured to disseminate a first set of messages to the first user device in response to the first request and a different second set of messages to the second device in response to the second request.

14. The interactive warning pad of claim 13, wherein the first set of messages includes assistive messages for guiding persons with disabilities, and wherein the second set of messages includes informational messages about nearby attractions or services.

15. A method for providing enhanced sensory feedback from an interactive warning pad, the method comprising:

monitoring a plurality of states associated with a potential hazard or a surface change;

receiving messaging at the interactive warning pad from a remote administrative controller;

providing a tactile feedback based on a user contacting a plurality of raised knobs that are distributed across a surface of the interactive warning pad; and providing different sensory feedback based on different illuminations of a plurality of lighting elements positioned under the plurality of raised knobs in response to a changing state of the plurality of states and the messaging received from the remote administrative controller, wherein providing the different sensory feedback comprises coordinating at least one of the different illuminations with an illumination of lighting elements of at least a second interactive warning pad at a different location based on the messaging received from the remote administrative controller.

16. The method of claim 15, wherein providing the different sensory feedback further comprises:

controlling different vibration patterns produced by a plurality of vibration motors integrated under the interactive warning pad in response to the plurality of states.

17. The method of claim 15 further comprising:

establishing a connection between the interactive warning pad and a traffic control signal or a crosswalk signal; and detecting a current state of the plurality of states based on messaging received over the connection.

18. The method of claim 15 further comprising:

broadcasting messaging indicating a current state of the plurality of states using a short-range wireless technology.

19. The method of claim 15 further comprising:

generating a different audible message for each state of the plurality of states.

20. The method of claim 15 further comprising:

detecting a presence of a human standing on the interactive warning pad using one or more pressure sensors or one or more motion sensors of the interactive warning pad; and activating a crosswalk button or an elevator call button in response to detecting the presence of the human.

* * * * *